US009266039B2

(12) United States Patent
Eacobacci, Jr. et al.

(10) Patent No.: US 9,266,039 B2
(45) Date of Patent: Feb. 23, 2016

(54) CRYOPUMP WITH CONTROLLED HYDROGEN GAS RELEASE

(75) Inventors: Michael J. Eacobacci, Jr., South Attleboro, MA (US); Allen J. Bartlett, New London, NH (US); John J. Casello, Norton, MA (US); Jeffrey A. Wells, Milford, NH (US)

(73) Assignee: Brooks Automation, Inc., Chelmsford, MA (US)

( * ) Notice: Subject to any disclaimer, the term of this patent is extended or adjusted under 35 U.S.C. 154(b) by 278 days.

(21) Appl. No.: 13/988,497

(22) PCT Filed: Nov. 23, 2011

(86) PCT No.: PCT/US2011/062098
§ 371 (c)(1),
(2), (4) Date: May 20, 2013

(87) PCT Pub. No.: WO2012/071540
PCT Pub. Date: May 31, 2012

(65) Prior Publication Data
US 2013/0239593 A1    Sep. 19, 2013

(51) Int. Cl.
*B60H 1/00* (2006.01)
*B01D 8/00* (2006.01)
(Continued)

(52) U.S. Cl.
CPC . *B01D 8/00* (2013.01); *F04B 37/08* (2013.01); *F04B 37/14* (2013.01)

(58) Field of Classification Search
CPC ........... B01D 8/00; F04B 37/08; F04B 37/14; F04B 49/08; F25B 9/14; F25B 49/022; F25B 9/00; Y10T 29/49236

USPC ................... 62/6, 48.1, 50.6, 51.1, 55.5, 612
See application file for complete search history.

(56) References Cited

U.S. PATENT DOCUMENTS 4,449,373 A * 5/1984 Peterson et al. ............... 62/55.5
4,494,381 A * 1/1985 Lessard ......................... 62/55.5
(Continued)

FOREIGN PATENT DOCUMENTS

EP          0 134 942 A1    6/1984
EP          0134942         3/1985
(Continued)

OTHER PUBLICATIONS

International Search Report and The Written Opinion of the International Searching Authority mailed on May 14, 2012 for International Application No. PCT/US2011/062098, "Cryopump With Controlled Hydrogen Gas Release," filed Nov. 23, 2011.
(Continued)

*Primary Examiner* — Mohammad M Ali
(74) *Attorney, Agent, or Firm* — Hamilton, Brook, Smith & Reynolds, P.C.

(57) ABSTRACT

A cryopump system includes a cryopump having a first cooling stage and a second cooling stage connected to the first cooling stage, the second cooling stage including a gas adsorber having a hydrogen adsorbing capacity of at least about 2 standard liters. The thermal storage capacity of the second cooling stage is sufficient to enable control of hydrogen pressure within the cryopump to satisfy ignition safety limits and limits on hydrogen flow rate in an exhaust line to be within limits of an abatement system to be coupled to the cryopump, upon warming of the second cooling stage during regeneration of up to a fully loaded cryopump.

39 Claims, 13 Drawing Sheets

(51) Int. Cl.
*F04B 37/08* (2006.01)
*F04B 37/14* (2006.01)

(56) References Cited

U.S. PATENT DOCUMENTS

| | | | |
|---|---|---|---|
| 4,555,907 A | 12/1985 | Bartlett | |
| 4,577,465 A | 3/1986 | Olsen et al. | |
| 5,111,667 A * | 5/1992 | Hafner et al. | 62/55.5 |
| 5,156,007 A | 10/1992 | Bartlett et al. | |
| 5,211,022 A | 5/1993 | Bartlett et al. | |
| 5,333,466 A | 8/1994 | Harrington et al. | |
| 5,357,760 A | 10/1994 | Higham | |
| 5,974,809 A | 11/1999 | Wooster et al. | |
| 6,327,863 B1 * | 12/2001 | Yamartino et al. | 62/55.5 |
| 7,256,111 B2 * | 8/2007 | Lopatin et al. | 438/513 |
| 2005/0155358 A1 | 7/2005 | Ash et al. | |
| 2005/0262852 A1 * | 12/2005 | Amundsen et al. | 62/55.5 |
| 2005/0274128 A1 | 12/2005 | Kishorenath et al. | |
| 2007/0283704 A1 * | 12/2007 | Tanaka | 62/55.5 |
| 2007/0295599 A1 * | 12/2007 | Tsuyuki | 204/192.1 |
| 2009/0007574 A1 * | 1/2009 | Amundsen et al. | 62/55.5 |
| 2009/0038319 A1 * | 2/2009 | Tsuyuki | 62/55.5 |
| 2009/0165469 A1 * | 7/2009 | Matsubara | 62/55.5 |
| 2009/0282841 A1 * | 11/2009 | Tanaka | 62/55.5 |
| 2009/0282842 A1 * | 11/2009 | Koyama | 62/56 |
| 2010/0000235 A1 * | 1/2010 | Tanaka | 62/55.5 |
| 2010/0077771 A1 * | 4/2010 | Tanaka | 62/55.5 |

FOREIGN PATENT DOCUMENTS

| | | |
|---|---|---|
| GB | 2158520 | 11/1985 |
| JP | H 0533767 A | 2/1993 |
| JP | 08-061233 | 3/1996 |
| JP | H 08193573 A | 7/1996 |
| JP | 11-141460 | 5/1999 |
| JP | 11-343972 | 12/1999 |

OTHER PUBLICATIONS

Notification Concerning Transmittal of Interntaional Preliminary Report on Patentability mailed Jun. 6, 2013 for International Application No. PCT/US2011/062098 filed Nov. 23, 2011 "Cryopump With Controlled Hydrogen Gas Release".

* cited by examiner

CRYOPUMP WITH CONTROLLED HYDROGEN GAS RELEASE

RELATED APPLICATION

This application is the U.S. National Stage of International Application No. PCT/US2011/062098, filed Nov. 23, 2011, which designates the U.S., published in English, and claims the benefit of U.S. Provisional Application No. 61/458,563, filed on Nov. 24, 2010. The entire teachings of the above applications are incorporated herein by reference.

BACKGROUND OF THE INVENTION

Cryopump systems currently used on semiconductor manufacturing tools and other applications are often required to cryopump a significant quantity of hydrogen gas ($H_2$). This $H_2$ gas emanates from manufacturing processes where hydrogen gas is used as a process gas (e.g., degas chambers) or where $H_2$ gas is released as a process byproduct (e.g., ion implantation).

Hydrogen gas ($H_2$) combined with oxygen within a prescribed pressure range and concentration level can burn or explode, and therefore the safe removal of hydrogen gas must be considered.

SUMMARY OF THE INVENTION

For safe release of large amounts of hydrogen from a cryopump, it is important that pressure be kept low, below 7 Torr, during the release, and that the flow rate of released gas not exceed the capacity of the abatement system coupled to the cryopump to handle the released gas. To that end, the gas should be released slowly. Unfortunately, once hydrogen begins to release with warming of the cryopanels during regeneration, the thermal insulation offered by the pumped vacuum is lost and the cryopanels rapidly warm, causing all of the adsorbed hydrogen to be rapidly released and potentially overwhelming the abatement system. To avoid that rapid release, the second stage of the cryopump is provided with a high thermal capacitance that is slow to warm even with the lost vacuum. As a result, hydrogen can be released more slowly and thus safely.

There is provided a cryopump system that includes a cryopump having a first cooling stage and a second cooling stage connected to the first cooling stage, the second cooling stage including a gas adsorber having a hydrogen adsorbing capacity of at least about 2 standard liters. The hydrogen adsorbing capacity can be at least about 5 standard liters. The thermal capacitance of the second cooling stage is sufficient to enable control of hydrogen pressure within the cryopump to satisfy ignition safety limits and control of hydrogen flow rate in an exhaust line within limits of an abatement system coupled to the cryopump, upon warming of the second cooling stage during regeneration of up to a fully loaded cryopump. The thermal storage capacity can be at least about 10,000 Joules, such as about 12,000 Joules, or at least about 15,000 Joules, over a temperature in a range of between about 10 K and about 50 K. The ratio between the thermal storage capacity and the hydrogen adsorbing capacity can be at least about 1000 Joules/liter over a temperature in a range of between about 10 K and about 50 K. Warming of the second cooling stage during regeneration of the cryopump from a temperature of about 20 K to a temperature of about 50 K can require more than about 4 minutes, such as more than about 5 minutes. The hydrogen pressure is controlled to less than about 7 Torr until substantially all hydrogen is desorbed and exhausted from the cryopump. The hydrogen flow rate can be controlled to less than about 2 standard liters per minute until substantially all hydrogen is desorbed and exhausted from the cryopump.

The cryopump system can include an electronic controller for controlling the cryopump, the controller including electronics programmed to, during a regeneration time, optionally turn off the refrigerator motor of the cryopump for a warm-up time. The regeneration time is the time until substantially all hydrogen is desorbed and exhausted from the cryopump. The warm-up time can be at least about 2 minutes, such as at least about 5 minutes. The electronics can be further programmed to turn on the refrigerator during the regeneration time if the temperature of a second cooling stage is greater than a threshold temperature within the warm-up time. The threshold temperature can be greater than or equal to about 40 K. The refrigerator can produce maximum refrigeration during at least a portion of the regeneration time. The refrigerator can be turned on until substantially all hydrogen is desorbed and exhausted from the cryopump. The electronics can be further programmed to heat the second cooling stage of the cryopump for a heating time during an initial portion of regeneration time, such as for a heating time less than or equal to about 25 seconds.

A method of cryopumping hydrogen includes cooling a cryopump as described above to a temperature at which hydrogen is adsorbed, and, during a regeneration time, desorbing hydrogen from the cryopump. The regeneration time is the time until substantially all hydrogen is desorbed and exhausted from the cryopump. As described above, the cryopump has a thermal storage capacity sufficient to enable control of hydrogen pressure to satisfy ignition safety limits and control of hydrogen flow rate in an exhaust line within limits of an abatement system coupled to the cryopump, upon warming of up to a fully loaded cryopump. The method can further include turning off the refrigerator motor of the cryopump for a warm-up time, followed by turning on the refrigerator during the regeneration time if the temperature of a second cooling stage is greater than a threshold temperature within the warm-up time. The threshold temperature can be greater than or equal to about 40 K. The warm-up time can be at least about 4 minutes, such as at least about 5 minutes. The refrigerator can produce maximum refrigeration during at least a portion of the regeneration time. The refrigerator can be turned on until substantially all hydrogen is desorbed and exhausted from the cryopump. The method can further include heating the second cooling stage of the cryopump for a heating time during an initial portion of the regeneration time, such as for a heating time less than or equal to about 25 seconds.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

The cryopump and methods of operation of the cryopump described below have been demonstrated to control the release of $H_2$ gas from the cryopump within safe prescribed limits. A prudent manner to maintain safety is to ensure that the partial pressure of $H_2$ within the cryopump and exhaust system remains less than the ignition safety limit, which is about 25% of the lower explosive limit (LEL, 4% of atmospheric pressure), which equals about 7 Torr. See SEMI S2-0703, Environmental, Health, and Safety Guideline for Semiconductor Manufacturing Equipment, 2003. Additionally, the maximum mass flow of $H_2$ gas in the exhaust should not exceed the limit for the exhaust abatement system (i.e., typically 2.0 standard (20° C., 1 atm) liters per minute (SLM)). Control of both $H_2$ gas partial pressure and also mass flow rate can be achieved with both a hardware design change and a software change to the cryopump system as described below.

Figure 1:
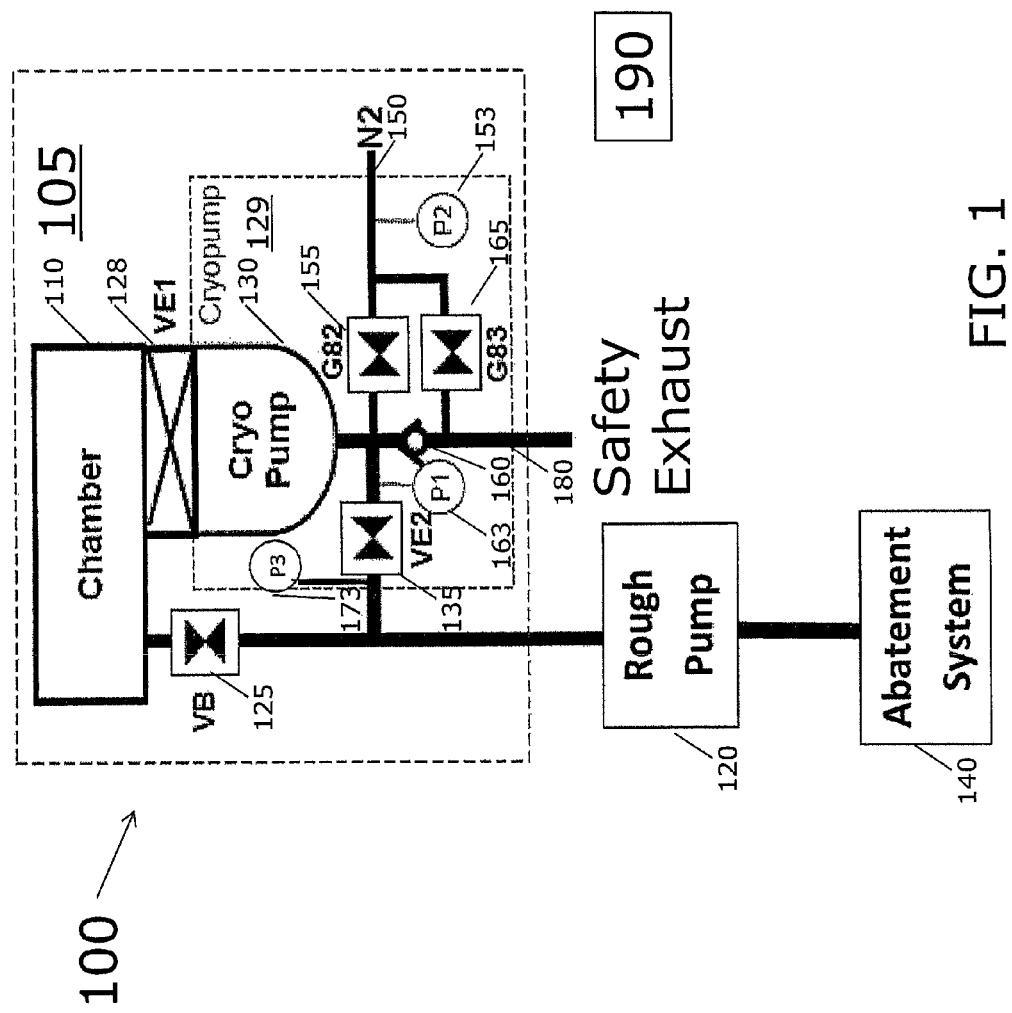
FIG. 1 is a schematic illustration of a process system.

A schematic illustration of a process system 100 is shown in FIG. 1. Process system 100 includes a process tool 105 that includes process chamber 110 initially pumped out by rough vacuum pump 120, followed by, after closing valve 125 and opening valve 128, high vacuum pumping by cryopump 130. Cryopump system 129 includes cryopump 130 that accumulates gases from processes (e.g., degas step of physical vapor deposition (PVD) processes, or other hydrogen processes such as ion implantation where hydrogen is a by-product) conducted in process chamber 110 over time, which are condensed and/or adsorbed due to the low temperature (i.e., typically 17 K on the second stage) inside the cryopump 130.

When the cryopump is at or near its maximum load of condensed and/or adsorbed gases, valves 125 and 128 are closed, and the cryopump is regenerated by warming the gases inside the cryopump and evacuating them through valve 135, rough pump 120 and abatement system 140. As discussed below, warming the gases inside the cryopump can be done by turning off the refrigerator of the cryopump, and/or by heating the surfaces inside the cryopump where the gases have adsorbed or condensed. A nitrogen purge is typically provided from nitrogen supply 150 through valve 155. Nitrogen inlet pressure is measured by pressure gauge 153. Nitrogen is an inert gas that helps to dilute the gases and also warm up the inside surfaces of cryopump 130. Nitrogen is also used to dilute, through valve 165, a safety exhaust 180 provided through check valve 160. The pressure of gases emerging from cryopump 130 during regeneration is measured by pressure gauge 163. A pressure switch 173 is also provided to check that the rough vacuum pump 120 is providing a sufficient rough vacuum, such as below 50 mTorr. The valves, pressure gauges and heating elements that comprise process system 100 are controlled by electronic controller 190. The electronic controller 190 can be remote (a separate controller or a controller on the host tool), local, or integral to the cryopump.

As discussed above, for up to a fully loaded cryopump, hydrogen pressure during regeneration needs to be controlled to satisfy ignition safety limits, and hydrogen flow rate in an exhaust line needs to be limited to the capacity of the abatement system 140 coupled to the cryopump 130. As discussed above, typical hydrogen pressure limit is about 7 Torr, and a typical exhaust flow rate limit is about 2 SLM.

Figure 2:
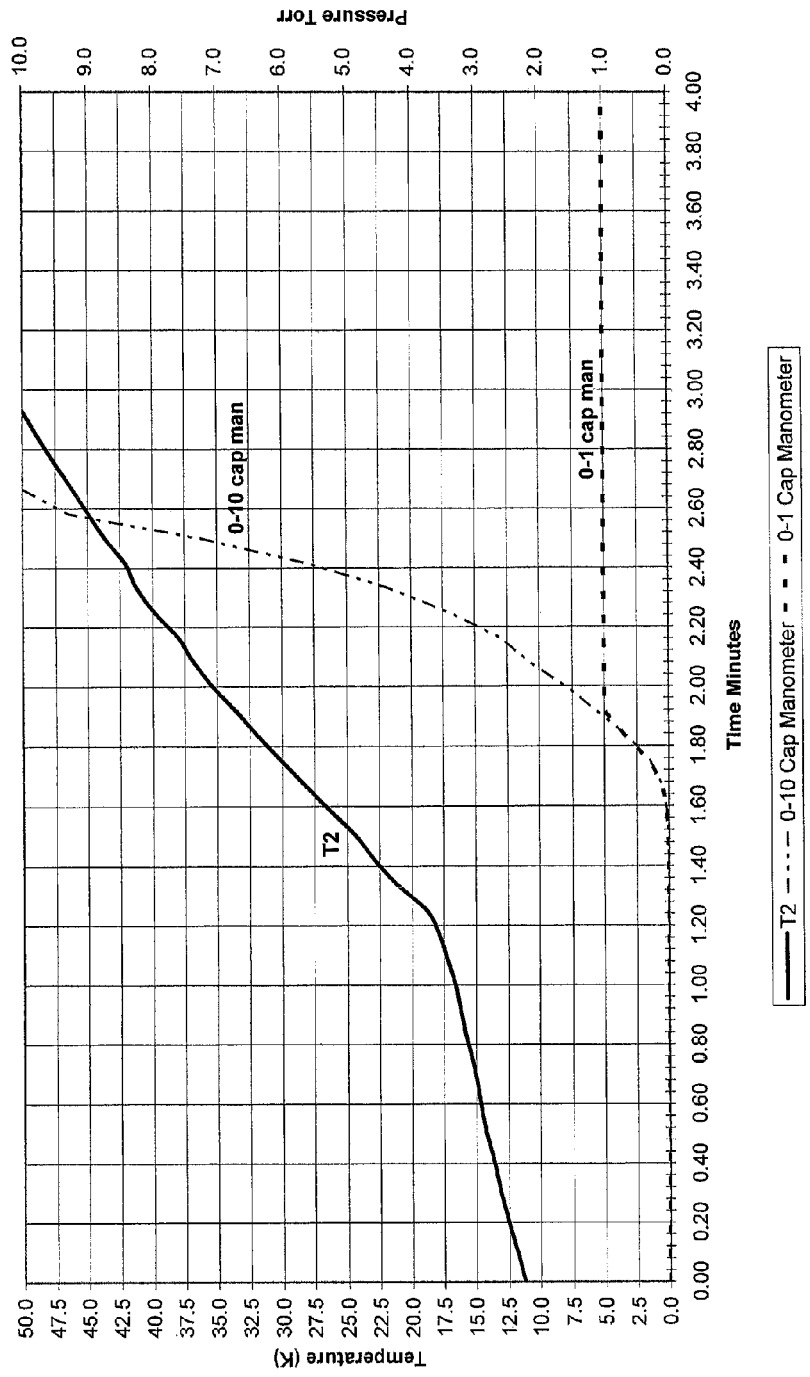
FIG. 2 is a graph of temperature and hydrogen pressure as a function of time after turning off the refrigerator in a typical cryopump without purge gas.
Figure 3:
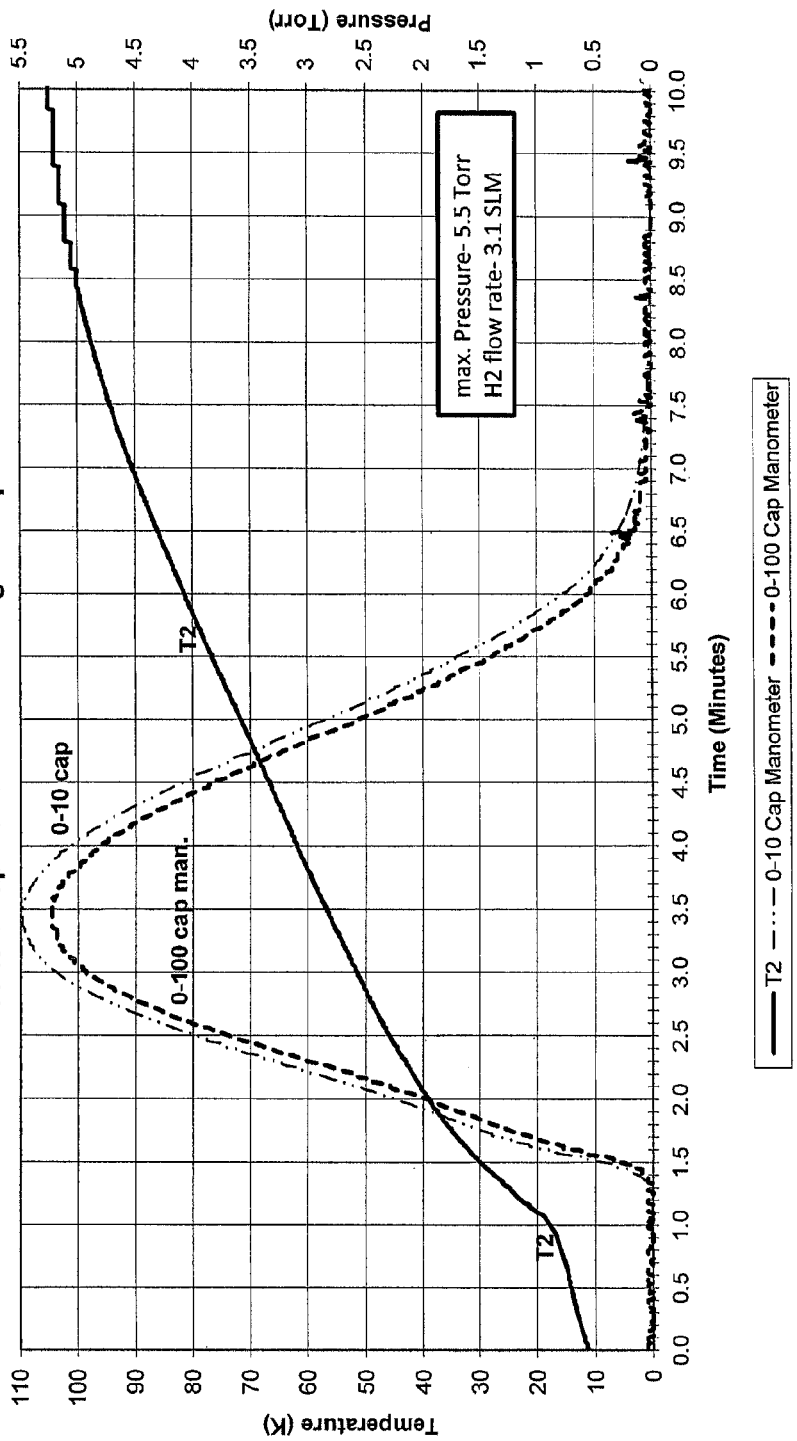
FIG. 3 is a graph of temperature and hydrogen pressure as a function of time after turning off the refrigerator and evacuating the hydrogen with a roughing pump in a typical cryopump without purge gas.

Cryopump designs have been described in many patents, such as U.S. Pat. No. 4,555,907, U.S. Pat. No. 5,156,007, U.S. Pat. No. 5,211,022, U.S. Pat. No. 5,333,466, and U.S. Pat. No. 5,974,809, incorporated by referency in their entirety. In a typical cryopump (e.g., CTI-8F, Brooks Automation, Inc., Chelmsford, Mass.), once the refrigerator motor is turned off with the gate valve 128 and rough valve 135 both closed, then, as shown in FIG. 2, the second stage temperature (T2) rises above 35 K in about 2 minutes, and the pressure rises above 7 Torr in less than 3 minutes. Hydrogen begins to be desorbed off the adsorber surfaces inside the cryopump at a temperature T2 above about 20 K, and substantially all hydrogen is desorbed off at a temperature above about 50 K, so the pressure rises above the ignition safety limit as hydrogen is substantially completely released. See P. A. Lessard, *Cryogenic adsorption of noncondensibles in the high-vacuum regime*, J. Vac. Sci. Technol. A Vol. 7(3) pp. 2373-2376 (1989). With the rough valve 135 closed, gas is exhausted through the safety exhaust valve 160, bypassing the abatement system. To safely release the hydrogen from the cryopump, warming of the second cooling stage during regeneration of the cryopump to a temperature of about 50 K needs to be slowed down to require more than about 4 minutes, such as more than about 5 minutes. If the rough valve 135 is opened when T2 is about 25 K, then, as shown in FIG. 3, within about 3.5 minutes, the pressure measured by pressure gauge 163 (P1) is about 5.5 Torr (i.e., less than the ignition safety limit of 7 Torr), but the hydrogen flow rate is about 3.1 SLM (i.e., more than the abatement system flow rate limit of 2 SLM).

Figure 4:
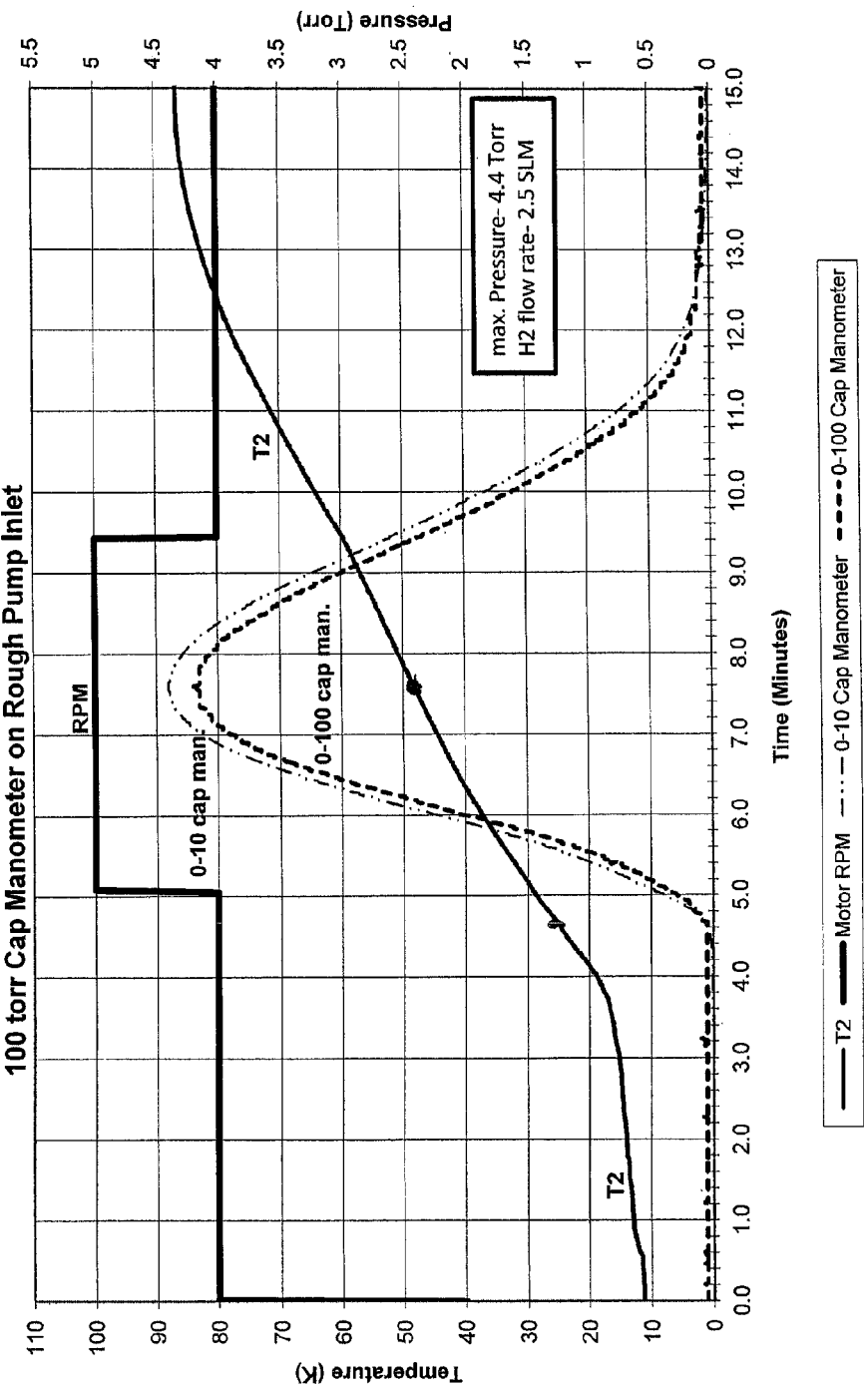
FIG. 4 is a graph of temperature and hydrogen pressure as a function of time with the refrigerator on and heat applied for warm up in a typical cryopump without purge gas.

In an effort to control the hydrogen flowrate, controlled heating can be applied to the second stage of cryopump 130 to desorb hydrogen while the refrigerator remains on, as shown in FIG. 4. If the second stage of the cryopump 130 is heated in a typical cryopump, then, even with the refrigerator remaining on (as shown by the refrigerator RPM line), hydrogen desorption produces a hydrogen exhaust flow rate of about 2.5 SLM (i.e., more than the abatement system flow rate limit of 2 SLM).

Figure 5:
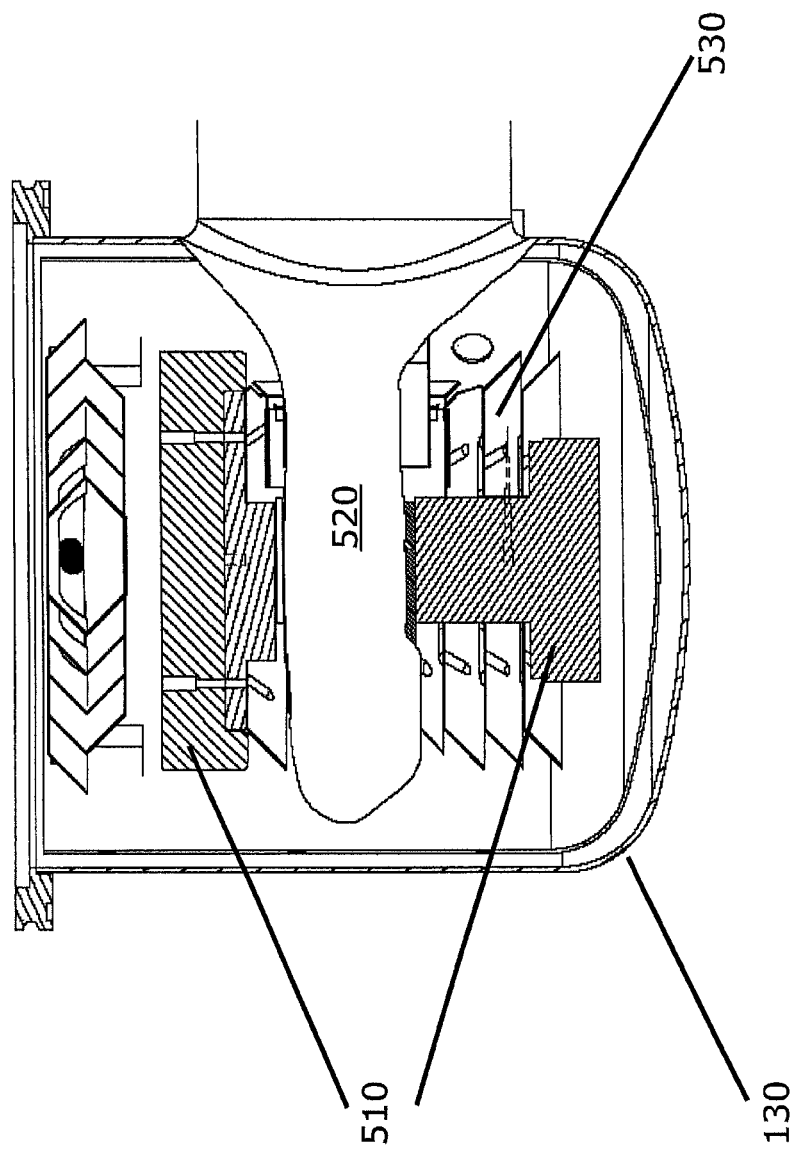
FIG. 5 is a schematic illustration of a cryopump having a thermal capacitor according to the invention.

To retain pressure below 7 Torr (or even 5 Torr) and to keep the flow of hydrogen gas under 2 SLM, desorption of hydrogen gas needs to be slowed. To that end, a large thermal mass is provided in thermal communication with cryopanels carrying the adsorbent. A cross section of the cryopump including the hardware design change to the above cryopump is shown in FIG. 5. The cryopump 130 includes the addition of increased thermal mass (thermal capacitor having a thermal storage capacity) 510 to help slow down the rapid evolution of $H_2$ gas from the charcoal adsorbent bed within the cryopump 130. The thermal masses 510 are coupled to the heat station of the refrigerator second stage above and below the end of the refrigerator cylinder 520. The thermal masses 510 can be added to baffles of second stage array top cap or directly to the second stage. The lower mass can be positioned between L-brackets supporting cryopanels 530 as described in the above patents.

In order to slowly release $H_2$, the thermal inertia of the second stage array should enable it to avoid having the array 530 warm up too quickly. A hydrogen process cryopump needs a hydrogen adsorbing capacity of at least 2 standard liters, such as at least about 5 standard liters, and a thermal storage capacity of at least about 10,000 Joules, such as at least about 12,000 Joules, or at least about 15,000 Joules, resulting in a ratio between the thermal storage capacity and the hydrogen adsorbing capacity of at least about 1000 Joules/liter, over a temperature in a range of between about 10 K and about 50 K. A fully loaded CTI-8F cryopump contains about 12 atm-L of $H_2$ captured by the cryopump and requires at least about 10,000 Joules, such about 15,000 J±3,000 J (i.e., 12,000 J, 15,000 J, or 18,000 J) of thermal storage capacity to increase the temperature of the cryopump from about 10 K to about 50-60 K ($\Delta T=40$ K) over a time of about 15-20 minutes while meeting safety requirements. The mass of the standard second stage heat station is about 1 pound (lb) and provides just 1,200 Joules of thermal storage capacity over a temperature range from about 10 K to about 60 K. The mass of copper would need to be increased by a factor of 12.5 to achieve the 15,000 Joules for the desired slow warming. For different materials selected as a thermal capacitor, the heat capacity will vary, and therefore the mass and volume of material needed for a thermal capacitor to provide the necessary thermal storage capacity will also vary. A larger hydrogen adsorbing capacity cryopump (e.g., CTI-320) will require a correspondingly larger thermal storage capacity. The thermal capacitor 510 needs to be small enough in size to fit inside the cryopump 130, and therefore is made of a material with a high specific heat capacity, such as lead (Pb) or tin antimony (Sn Sb) alloy. In one embodiment, the thermal capacitor 510 shown in FIG. 5 includes two pieces of tin antimony alloy with a total mass of about 8.2 lbs. Hydrogen regeneration using the thermal capacitor 510 described above yielded the results shown in FIG. 6A, where the hydrogen exhaust flow rate was 2.1 SLM (i.e., almost equal to the desired 2.0 SLM), and then, by employing a higher pumping speed rough pump 120 (13.9 l/s instead of 7 l/s at the cryopump) the hydrogen exhaust flow rate was reduced to the desired 2.0 SLM, as shown in FIG. 6B, because the higher pumping speed of the rough pump 120 substantially decreased hydrogen gas pressure within the exhaust line according to the relationship: hydrogen exhaust flowrate=pumping speed×hydrogen pressure. The pumping speed of the rough pump 120 is designed to match the desorption rate of hydrogen, by providing a sufficient rough pumping speed at the cryopump (i.e., accounting for pumping speed losses from connecting tubing).

Figure 7:
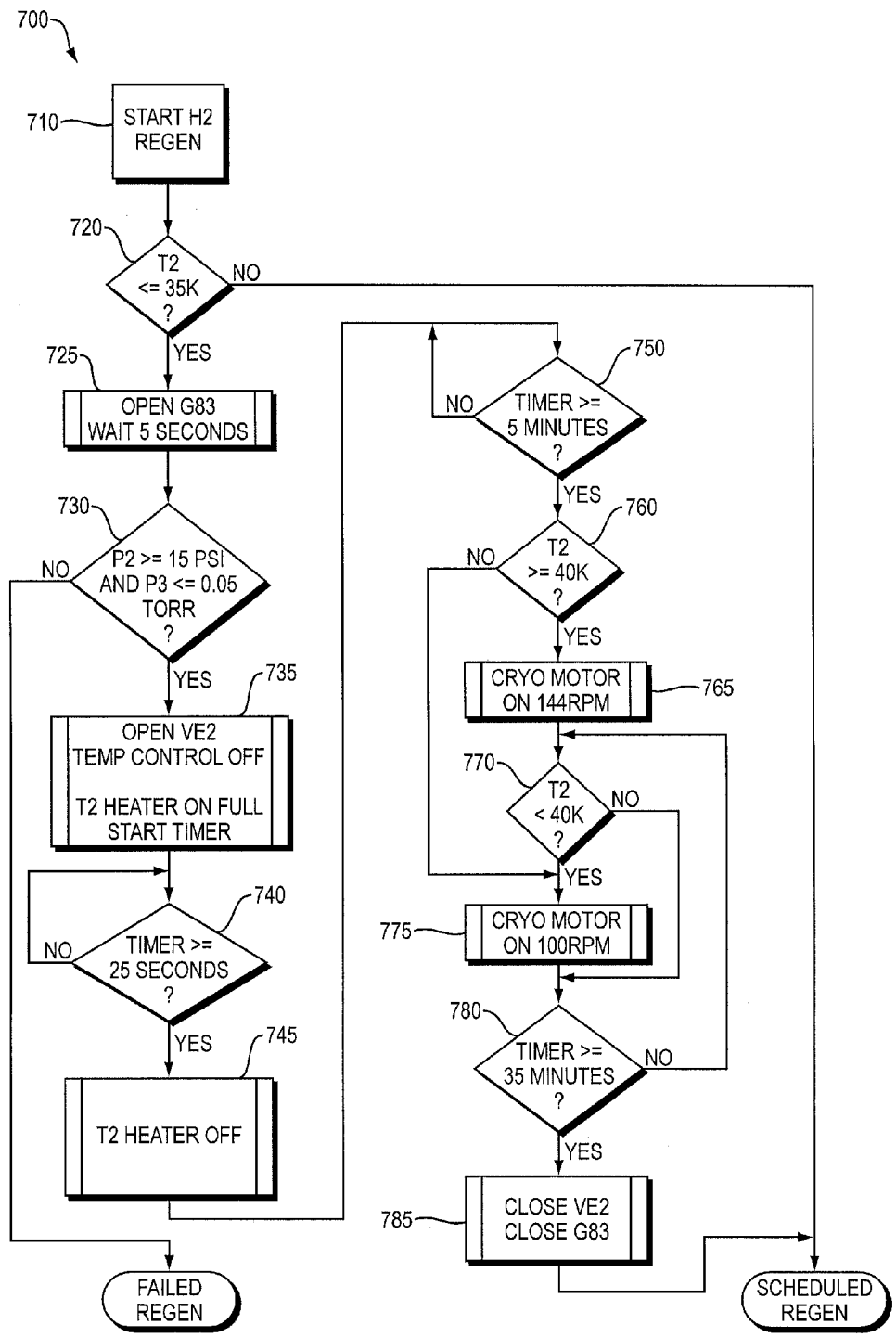
FIG. 7 is a flowchart of a hydrogen regeneration process with the refrigerator on during the entire process.

In a preferred embodiment, a software design change modifies the On-Board® IS cryopump control logic of controller 190 to safely desorb the $H_2$ gas using the thermal capacitor 510. In one embodiment, a process tool 105 illustrated in FIG. 1 is operated according to the flow chart shown in FIG. 7, resulting in the pressure, temperature, and refrigerator RPM curves shown in FIG. 8. Once the chamber roughing valve 125 (VB) and gate valve 128 (VE1) are closed (FIG. 1), the hydrogen regeneration process 700 begins, at step 710, with the refrigerator at its normal operating speed of 72 RPM, and with a check, at step 720, that the temperature of the second stage of the cryopump (T2) is less than or equal to 35 K. As discussed above, if T2 is greater than 35 K, then there is almost no hydrogen adsorbed in the pump and therefore a scheduled regeneration of any other gases can safely be carried out. The controller then, at step 725, opens valve 165 (G83) and waits 5 seconds for nitrogen to flow into safety exhaust 180. Additional safety checks include, at step 730, checking that pressure gauge 153 (P2) is greater than or equal to 15 psi, for the safety exhaust 180, and checking that pressure gauge 173 (P3) reads less than or equal to 50 mTorr, ensuring that rough pump 120 is providing an adequate vacuum, otherwise regeneration is aborted.

Having passed these safety checks, then, at step 735, the controller 190 opens valve 135 (VE2) and turns on the heater for a heating time designed to provide an amount of heat sufficient to cause a slow rise in temperature T2, such as 25 seconds that provide about 3,500 Joules, timed at step 740. The temperature of the second stage would rise too slowly without heating, due to the added thermal capacitance. At the end of the heating time, the heater is turned off at step 745, and the controller 190 waits for a warm-up time, at step 750, for example for about 5 minutes, before checking, at step 760, whether T2 has reached 40 K.

Figure 8:
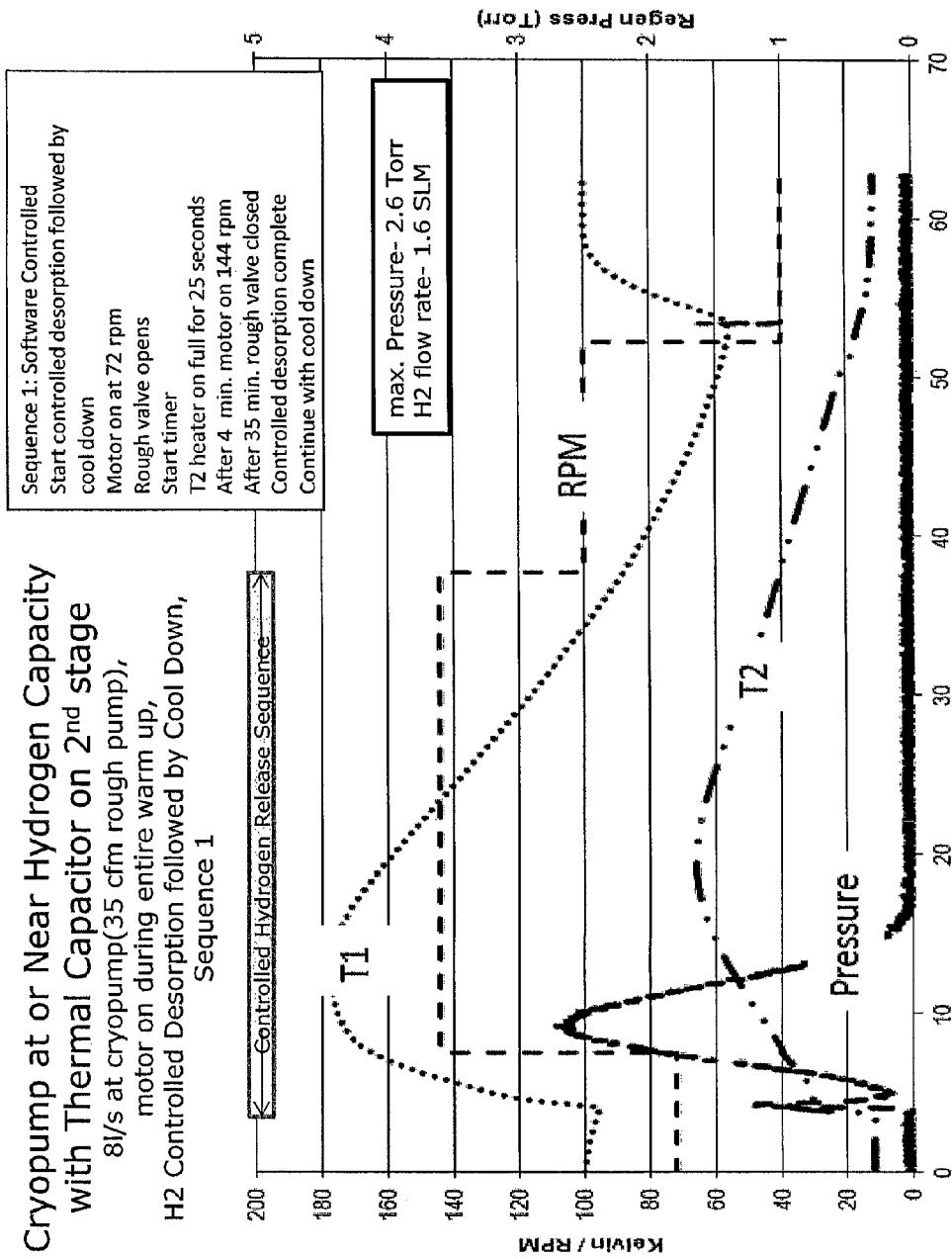
FIG. 8 is a graph of temperature, hydrogen pressure, and refrigerator RPM as a function of time for the hydrogen regeneration process shown in FIG. 7.

The refrigerator motor can operate at full speed (144 rotations per minute (RPM) for this refrigerator) above 40 K. Below 40 K, the density of helium generates excessive resistance (torque), and therefore the maximum speed of this refrigerator below 40 K is 100 RPM. Turning back to FIG. 7, if T2 is equal to or greater than 40 K, then the controller 190 increases the speed of the refrigerator from the standard service speed of 72 RPM to 144 RPM (maximum refrigeration for this refrigerator motor). Other suitable refrigerators can produce maximum refrigeration at other RPMs. Meanwhile, peak hydrogen pressure occurs after at least about 4 minutes, such as about 8 minutes, and with continued operation of the refrigerator motor, T2 begins to drop, as shown in FIG. 8. Once T2 is less than 40 K, then, at step 770, the controller 190 decreases the speed of the refrigerator to 100 RPM.

Turning back to FIG. 7, if T2 is less than 40 K at step 760, then the controller, at step 775, increases the speed of the refrigerator to 100 RPM. Then, at step 780, after the regeneration time (e.g., 35 minutes) is complete, the controller 190 closes valve 135 (VE2) and valve 165 (G83) and the hydrogen regeneration process 700 is completed. Then the user can carry out a scheduled full regeneration of any other gases still remaining in the cryopump, or a fast regeneration (see U.S. Pat. No. 5,375,424), or continue to allow the cryopump to cool down to its operating temperature and return the cryopump back into service by opening valve 128 (VE1).

Hydrogen regeneration process 700 controls the hydrogen pressure to a maximum of 2.6 Torr, and the hydrogen exhaust flow rate to a maximum of 1.6 SLM, as shown in FIG. 8, and therefore meets both requirements stated above. The amount of heat input by the heater into the second stage of the cryopump at step 740 is dependent, however, on the size of the refrigerator that is operating (and therefore removing heat) during the heating time, as shown in FIG. 8. An alternative hydrogen process 900, shown in FIG. 9, was developed to make the initial warm-up independent of the refrigerator size.

Process 900 controls the hydrogen pressure and exhaust flow rate with the refrigerator off during the heating time.

Figure 9:
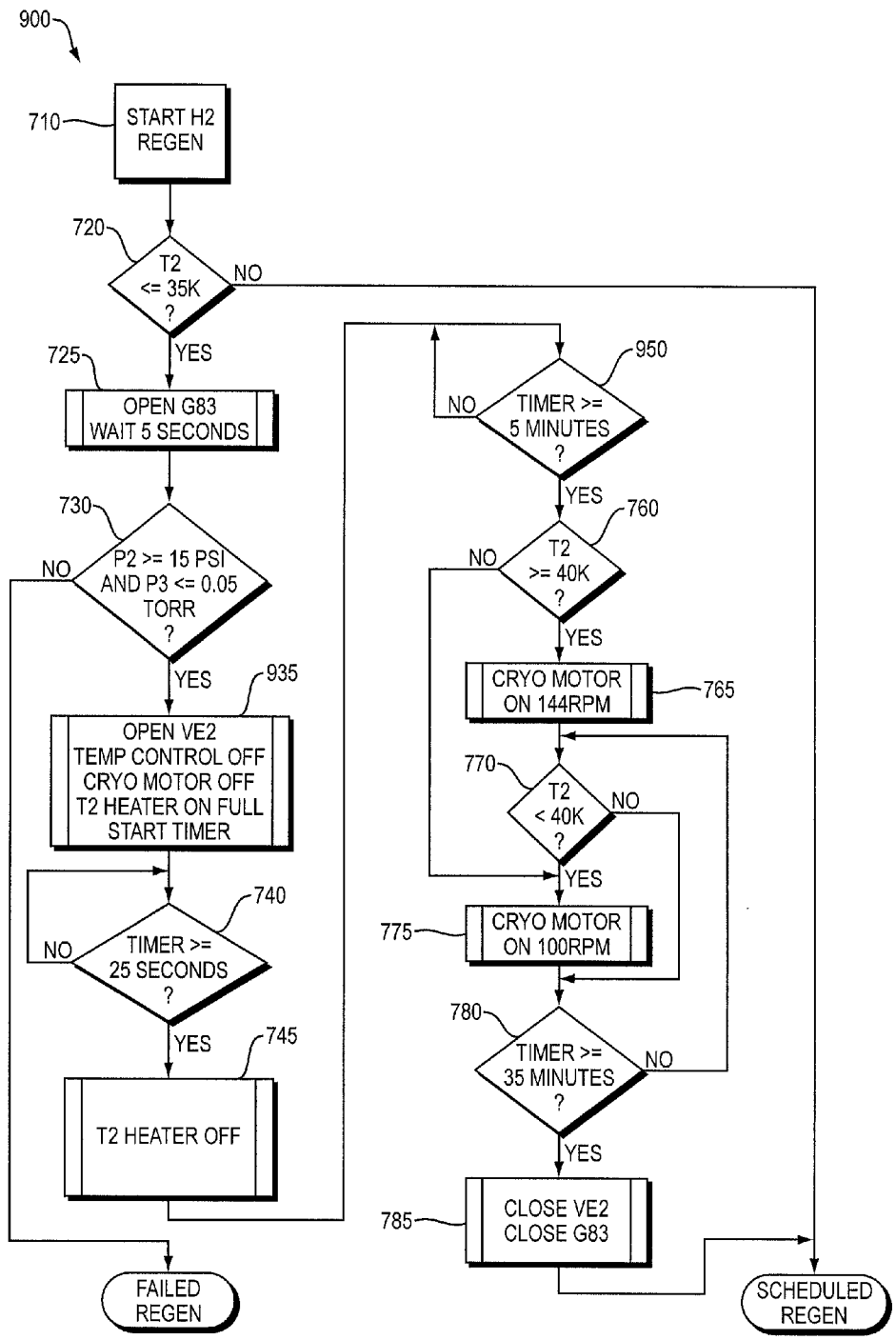
FIG. 9 is a flowchart of a hydrogen regeneration process with the refrigerator off during the heating time.
Figure 10:
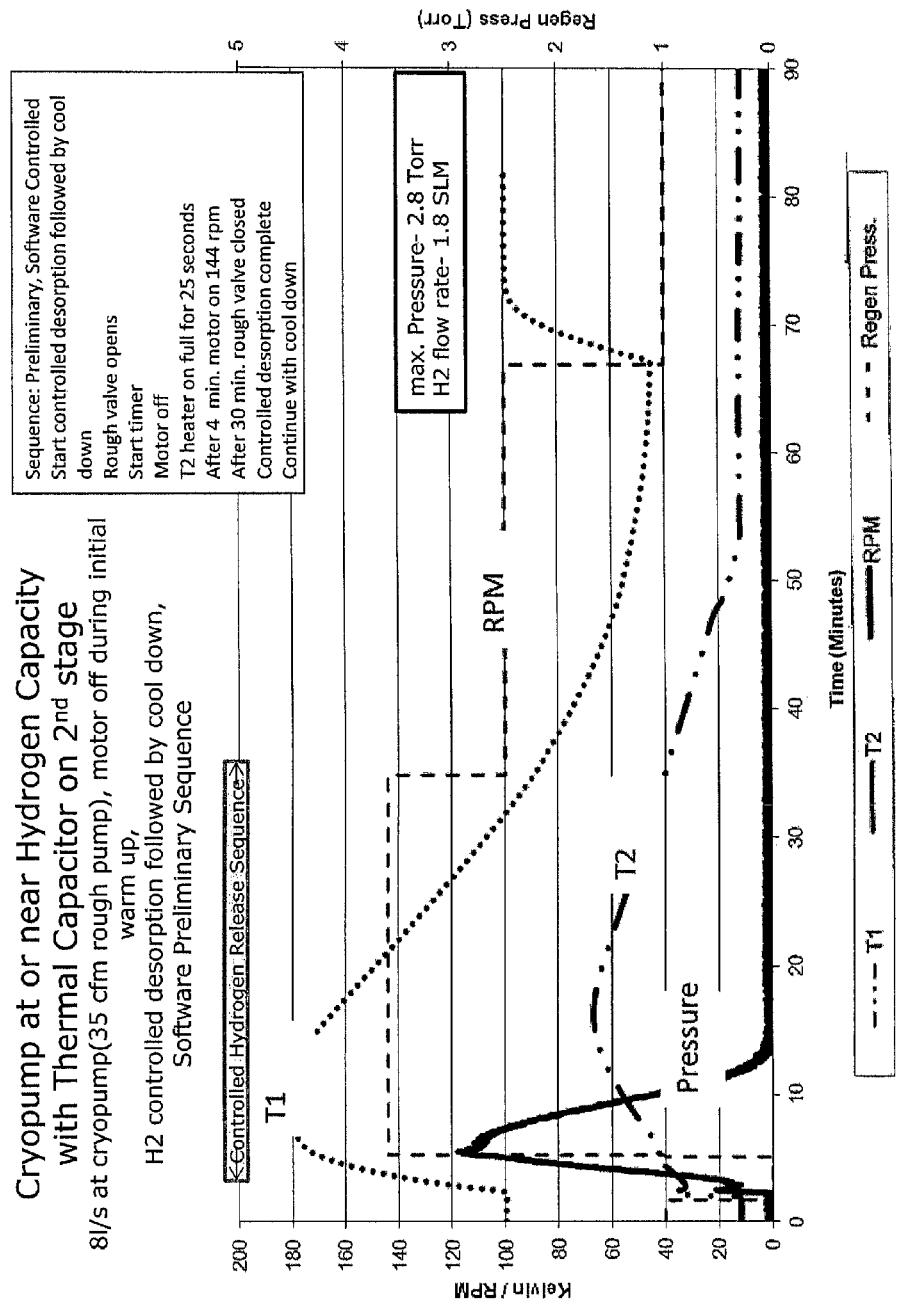
FIG. 10 is a graph of temperature, hydrogen pressure, and refrigerator RPM as a function of time for the hydrogen regeneration process shown in FIG. 9.
Figure 11:
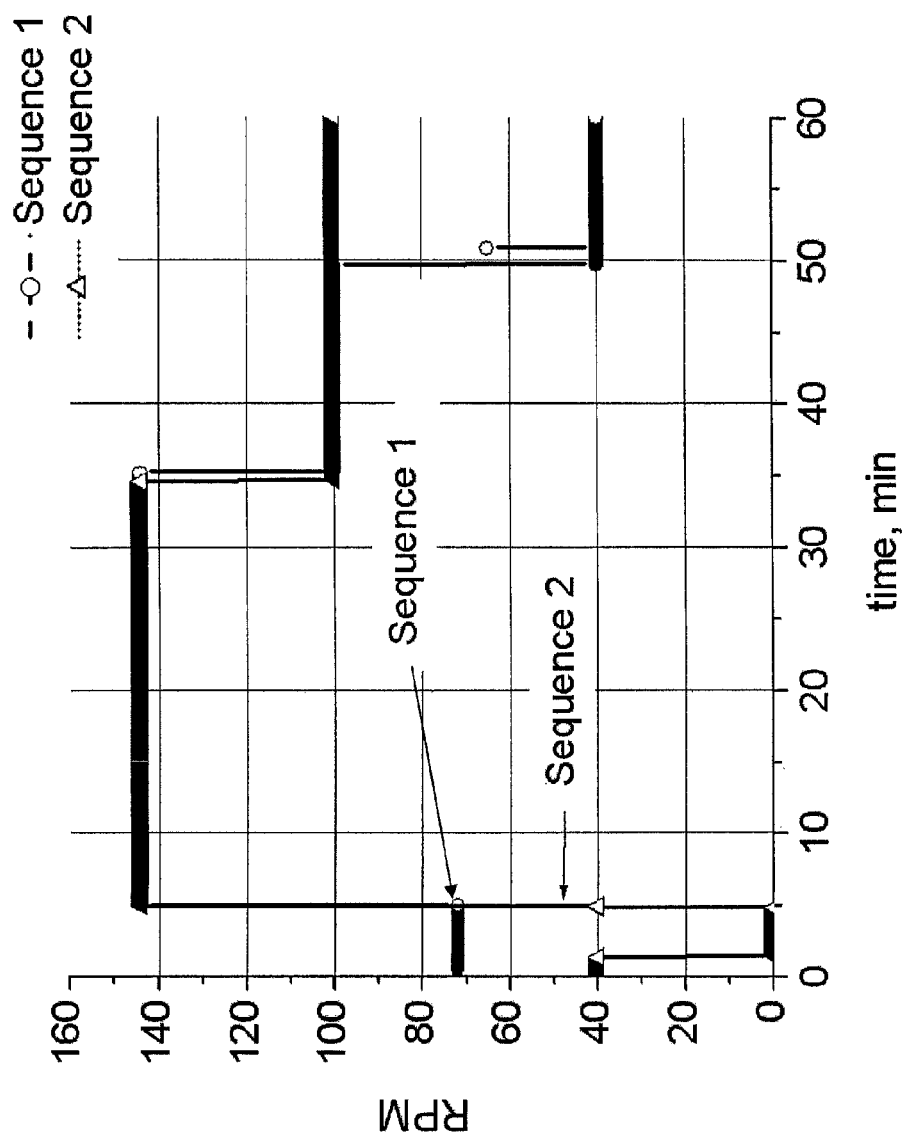
FIG. 11 is a graph of refrigerator RPM as a function of time for the hydrogen regeneration processes shown in FIG. 7 (Sequence 1) and FIG. 9 (Sequence 2).
Figure 12:
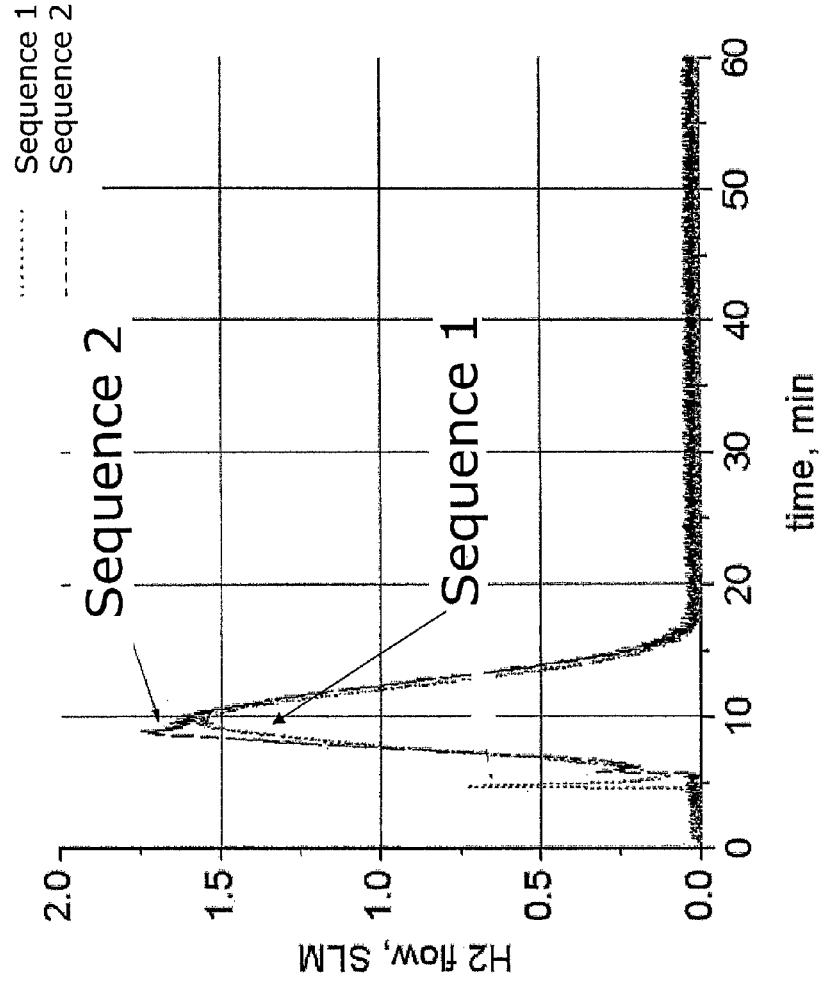
FIG. 12 is a graph of hydrogen exhaust flow rate as a function of time for the hydrogen regeneration processes shown in FIG. 7 (Sequence 1) and FIG. 9 (Sequence 2).

Turning to FIG. 9 and the resulting pressure, temperature, and refrigerator RPM curves shown in FIG. 10, most of the steps in hydrogen regeneration process 900 are the same as those of hydrogen regeneration process 700, except that the cryogenic refrigerator is turned off when the timer is started at step 935, and the time for the warm-up time at step 950 can be, for example 5 minutes as shown in FIG. 9, or 4 minutes, as shown in FIG. 10. The difference between step 735 (refrigerator on, Sequence 1) and step 935 (refrigerator off, Sequence 2) is shown in FIG. 11. The resulting maximum hydrogen pressure for hydrogen regeneration process 900, shown in FIG. 10, is about 2.8 Torr. The resulting hydrogen exhaust flow rates for hydrogen regeneration processes 700 (Sequence 1) and 900 (Sequence 2), both below 2 SLM, are shown in FIG. 12. Hydrogen maximum pressure results and maximum flowrate results, and warming times of the second stage during regeneration of the cryopump from a temperature of about 20 K to about 50 K for the results shown in FIGS. 3, 4, 6A, 6B, 8, and 10 are compiled in Table 1.

TABLE 1

Hydrogen pressure and flowrate, and 20-50 K warming time

Figure 6A:
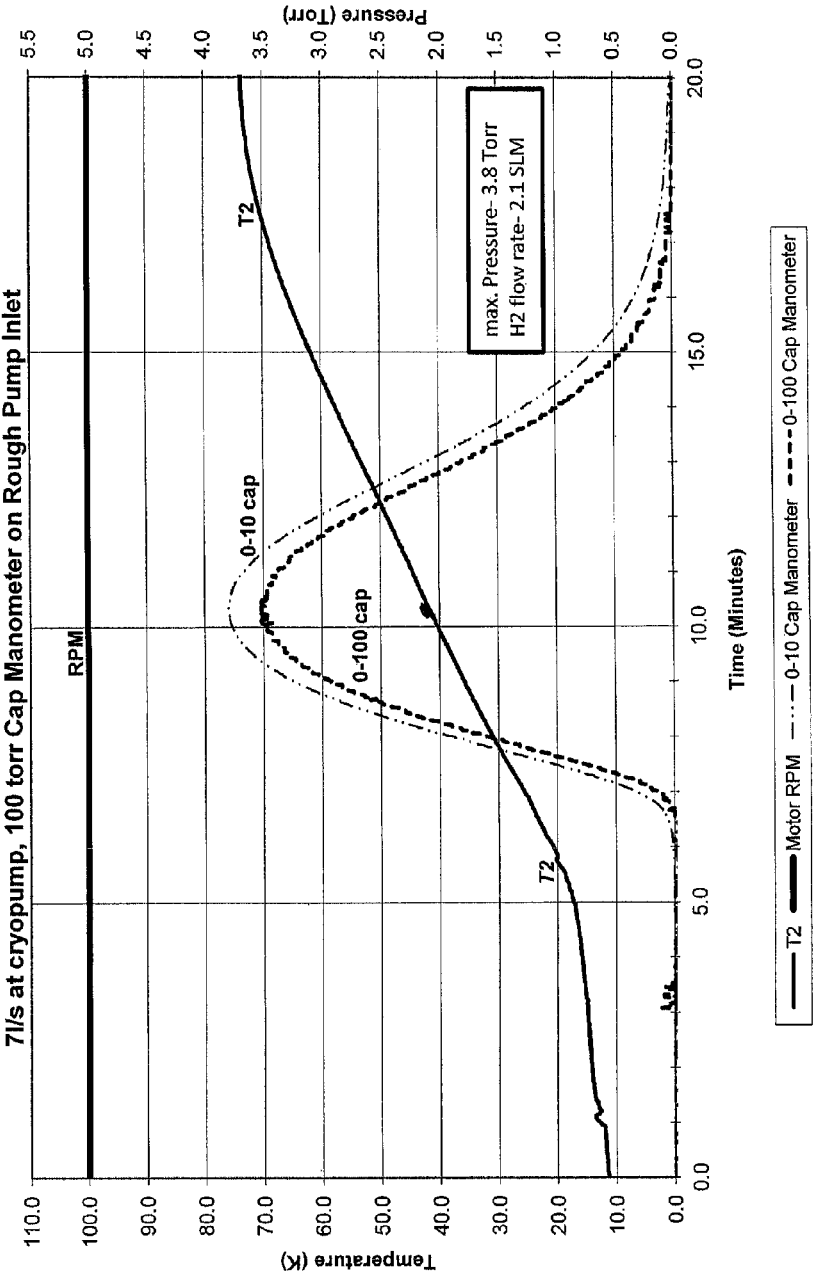
FIG. 6A is a graph of temperature, hydrogen pressure, and refrigerator RPM as a function of time with heat applied in a cryopump with a thermal capacitor as shown in FIG. 5.
Figure 6B:
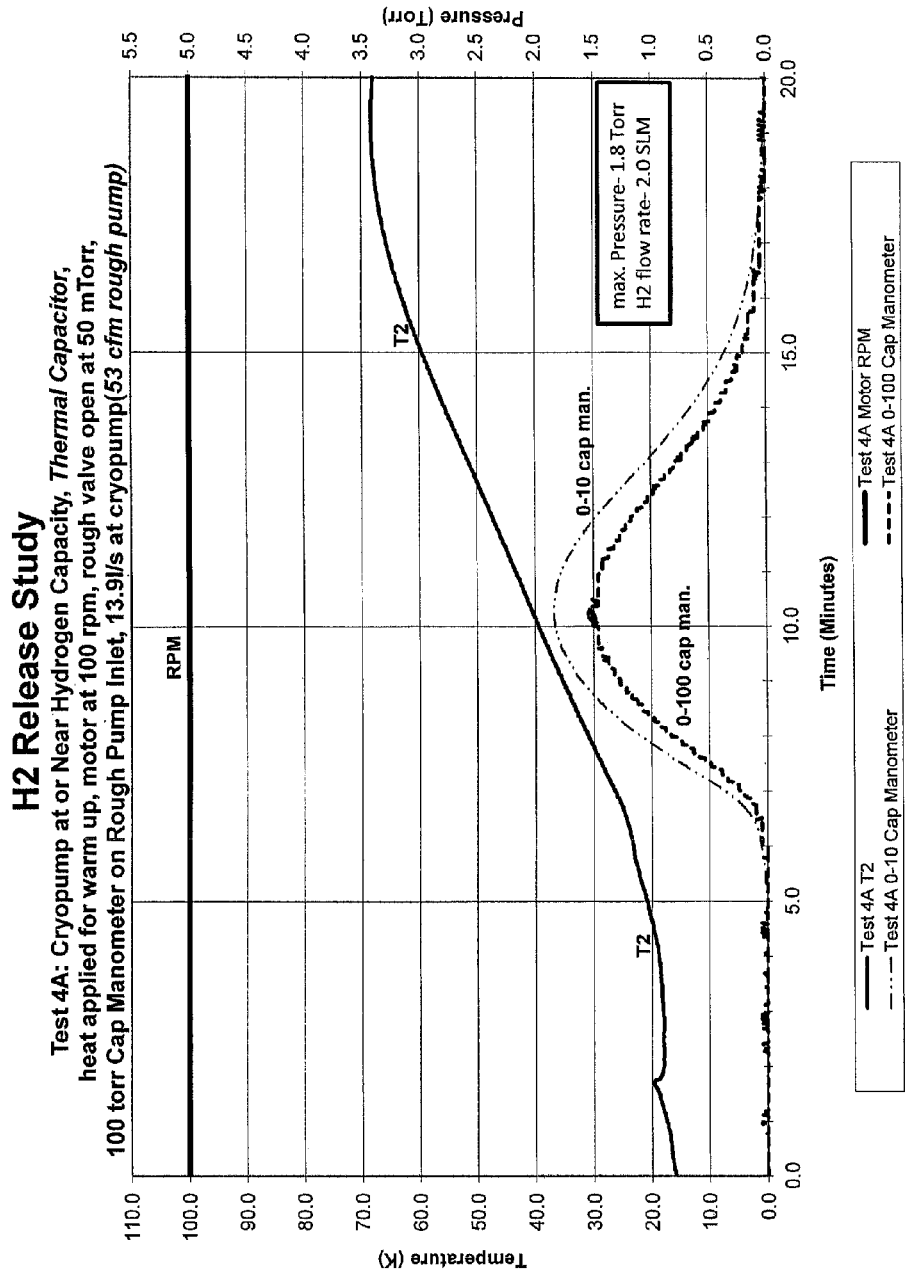
FIG. 6B is a graph of temperature, hydrogen pressure, and refrigerator RPM as a function of time with heat applied in a cryopump with a thermal capacitor as shown in FIG. 5, and with a 13.9 l/s roughing pump speed at cryopump.

|  | FIG. 3 | FIG. 4 | FIG. 6A | FIG. 6B | FIG. 8 | FIG. 10 |
| --- | --- | --- | --- | --- | --- | --- |
| Pressure (Torr) | 5.5 | 4.4 | 3.8 | 1.8 | 2.6 | 2.8 |
| Flowrate (SLM) | 3.1 | 2.5 | 2.1 | 2.0 | 1.6 | 1.8 |
| Time 20-50 K (min) | 1.5 | 3.7 | 6.2 | 8.2 | 8.2 | 6.3 |

At the end of the hydrogen regeneration process 900, the user can carry out a scheduled full regeneration of any other gases still remaining in the cryopump, or a fast regeneration (see U.S. Pat. No. 5,375,424), or allow the cryopump to cool down to its operating temperature and return the cryopump back into service by opening valve 128 (VE1).

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A cryopump system comprising a cryopump including:
  i) a first cooling stage;
  ii) a second cooling stage connected to the first cooling stage, the second cooling stage including a gas adsorber having a hydrogen adsorbing capacity of at least about 2 standard liters; and
  iii) a thermal mass on the second cooling stage, the thermal mass having thermal storage capacity sufficient to enable control of hydrogen partial pressure within the cryopump to satisfy ignition safety limits, wherein the hydrogen partial pressure is controlled to less than about 7 Torr until substantially all hydrogen is desorbed and exhausted from the cryopump, and control of hydrogen flow rate in an exhaust line within limits of an abatement system coupled to the cryopump, upon warming of the second cooling stage during regeneration of up to a fully loaded cryopump.

2. The cryopump system of claim 1, wherein the hydrogen adsorbing capacity is at least about 5 standard liters.

3. The cryopump system of claim 1, wherein the hydrogen flow rate is controlled to less than about 2 standard liters per minute until substantially all hydrogen is desorbed and exhausted from the cryopump.

4. The cryopump system of claim 1, further including an electronic controller for controlling the cryopump, the controller including electronics programmed to, during a regeneration time, turn off a refrigerator motor of the cryopump for a warm-up time.

5. The cryopump system of claim 4, wherein the electronics are further programmed to turn on the refrigerator during the regeneration time if the temperature of a second cooling stage is greater than a threshold temperature within the warm-up time.

6. The cryopump system of claim 5, wherein the threshold temperature is greater than or equal to about 40 K.

7. The cryopump system of claim 5, wherein the refrigerator produces maximum refrigeration during at least a portion of the regeneration time.

8. The cryopump system of claim 5, wherein the refrigerator is turned on until substantially all hydrogen is desorbed and exhausted from the cryopump.

9. The cryopump system of claim 4, wherein the regeneration time is the time until substantially all hydrogen is desorbed and exhausted from the cryopump.

10. The cryopump system of claim 4, wherein the warm-up time is at least about 4 minutes.

11. The cryopump system of claim 4, wherein the warm-up time is at least about 5 minutes.

12. The cryopump system of claim 4, wherein the electronics are further programmed to heat the second cooling stage of the cryopump during an initial portion of regeneration time.

13. The cryopump system of claim 12, wherein the electronics are programmed to heat the second stage of the cryopump for a time less than or equal to about 25 seconds.

14. The cryopump system of claim 1, wherein the thermal storage capacity is at least about 10,000 Joules, over a temperature in a range of between about 10 K and about 50 K.

15. The cryopump system of claim 14, wherein the thermal storage capacity is at least about 12,000 Joules.

16. The cryopump system of claim 15, wherein the thermal storage capacity is at least about 15,000 Joules.

17. The cryopump system of claim 1, wherein a ratio between the thermal storage capacity and the hydrogen adsorbing capacity is at least about 1000 Joules/liter, over a temperature in a range of between about 10 K and about 50 K.

18. The cryopump system of claim 1, wherein warming of the second cooling stage during regeneration of the cryopump from a temperature of about 20 K to a temperature of about 50 K requires more than about 4 minutes.

19. The cryopump system of claim 18, wherein warming of the second cooling stage during regeneration of the cryopump from a temperature of about 20 K to a temperature of about 50 K requires more than about 5 minutes.

20. A cryopump comprising:
  i) a first cooling stage;
  ii) a second cooling stage connected to the first cooling stage, the second cooling stage including a gas adsorber having a hydrogen adsorbing capacity of at least about 2 standard liters; and
  iii) a thermal mass on the second cooling stage, the thermal mass having a thermal storage capacity of at least about 10,000 Joules, over a temperature in a range of between about 10 K and about 50 K.

21. The cryopump of claim 20, wherein the hydrogen adsorbing capacity is at least about 5 standard liters.

22. The cryopump of claim 20, wherein the thermal storage capacity is at least about 12,000 Joules.

23. The cryopump of claim 22, wherein the thermal storage capacity is at least about 15,000 Joules.

24. A method of cryopumping hydrogen comprising:
   i) cooling a cryopump including a gas adsorber having a hydrogen adsorbing capacity of at least about 2 standard liters to a temperature at which hydrogen is adsorbed; and
   ii) during a regeneration time, desorbing hydrogen from the cryopump, the cryopump having a thermal mass of thermal storage capacity sufficient to enable control of hydrogen partial pressure to satisfy ignition safety limits, wherein the hydrogen partial pressure during the regeneration time is controlled to less than about 7 Torr until substantially all hydrogen is desorbed and exhausted from the cryopump, and control of hydrogen flow rate in an exhaust line within limits of an abatement system coupled to the cryopump, upon warming of up to a fully loaded cryopump.

25. The method of claim 24, wherein the gas adsorber has a hydrogen adsorbing capacity of at least about 5 standard liters.

26. The method of claim 24, wherein the hydrogen flow rate during the regeneration time is controlled to less than about 2 standard liters per minute until substantially all hydrogen is desorbed and exhausted from the cryopump.

27. The method of claim 24, further including turning off a refrigerator motor of the cryopump for a warm-up time.

28. The method of claim 27, wherein the warm-up time is at least about 4 minutes.

29. The method of claim 28, wherein the warm-up time is at least about 5 minutes.

30. The method of claim 27, further including turning on the refrigerator during the regeneration time if the temperature of a second cooling stage is greater than a threshold temperature within the warm-up time.

31. The method of claim 30, wherein the threshold temperature is greater than or equal to about 40 K.

32. The method of claim 30, wherein the refrigerator produces maximum refrigeration during at least a portion of the regeneration time.

33. The method of claim 30, wherein the refrigerator is turned on until substantially all hydrogen is desorbed and exhausted from the cryopump.

34. The method of claim 24, wherein the regeneration time is the time until substantially all hydrogen is desorbed and exhausted from the cryopump.

35. The method of claim 24, wherein the thermal storage capacity is at least about 12,000 Joules, over a temperature in a range of between about 10 K and about 50 K.

36. The method of claim 35, wherein the thermal storage capacity is at least about 15,000 Joules.

37. The method of claim 24, wherein a ratio between the thermal storage capacity and the hydrogen adsorbing capacity is at least about 1000 Joules/liter, over a temperature in a range of between about 10 K and about 50 K.

38. The method of claim 24, further including heating the second cooling stage of the cryopump during an initial portion of the regeneration time.

39. The method of claim 38, wherein heating the second cooling stage of the cryopump is conducted for a time less than or equal to about 25 seconds.

* * * * *